(12) United States Patent
Robertson et al.

(10) Patent No.: US 7,032,470 B2
(45) Date of Patent: Apr. 25, 2006

(54) YOKE BEARING PROVIDING IMPROVED SUPPORT

(75) Inventors: James Robertson, Walled Lake, MI (US); Sunil Palakodati, Canton, MI (US); Edward Fowlkes, Northville, MI (US); Matthew Yanosek, Birmingham, MI (US)

(73) Assignee: Visteon Globsl Technologies, Inc., Dearborn, MI (US)

( * ) Notice: Subject to any disclaimer, the term of this patent is extended or adjusted under 35 U.S.C. 154(b) by 308 days.

(21) Appl. No.: 10/459,170

(22) Filed: Jun. 11, 2003

(65) Prior Publication Data

US 2004/0250640 A1     Dec. 16, 2004

(51) Int. Cl.
*F16H 1/04* (2006.01)
(52) U.S. Cl. ............................. 74/422; 74/29
(58) Field of Classification Search ................. 384/49; 74/409, 422, 29, 30, 498; F16H 55/28; B62D 3/12
See application file for complete search history.

(56) References Cited

U.S. PATENT DOCUMENTS

| | | | | |
|---|---|---|---|---|
| 2,987,348 A * | 6/1961 | Blazek | ........................ | 384/30 |
| 3,897,982 A | 8/1975 | Teramachi | .................. | 308/6 R |
| 4,271,716 A * | 6/1981 | Carduner | ..................... | 74/422 |
| 4,429,922 A | 2/1984 | Pfluger | ....................... | 308/6 R |
| 4,531,603 A | 7/1985 | VanCise, Jr. | ................ | 180/148 |
| 4,553,447 A | 11/1985 | Betz | ............................ | 74/422 |
| 4,651,585 A | 3/1987 | Donn et al. | ................... | 74/422 |
| 4,724,717 A | 2/1988 | Chikuma | .................... | 174/498 |
| 4,762,014 A | 8/1988 | Sano | ........................... | 74/422 |
| 4,788,878 A * | 12/1988 | Morita et al. | ................. | 74/422 |
| 5,058,448 A | 10/1991 | Kiyooka et al. | .............. | 74/422 |
| 5,316,390 A * | 5/1994 | Hanaway | ..................... | 384/49 |
| 5,931,046 A * | 8/1999 | Phillips | ....................... | 74/422 |
| 5,983,742 A | 11/1999 | Morris et al. | ................. | 74/422 |
| 6,408,708 B1 | 6/2002 | Sahr | ............................ | 74/422 |
| 6,467,366 B1 | 10/2002 | Gierc | ........................... | 74/422 |
| 6,539,821 B1 * | 4/2003 | Bugosh | ....................... | 74/422 |
| 2002/0084136 A1 | 7/2002 | Fowlkes et al. | ............ | 180/428 |
| 2002/0124670 A1 | 9/2002 | Bugosh | .................. | 74/388 PS |

\* cited by examiner

*Primary Examiner*—Richard W. Ridley
*Assistant Examiner*—Justin Krause
(74) *Attorney, Agent, or Firm*—Brinks Hofer Gilson & Lione

(57) ABSTRACT

A steering gear assembly includes a pinion defining a pinion axis and a rack defining a rack axis. A bearing assembly includes a roller bearing biased against the rack to generate a normal force pressing the rack into engagement with the pinion. The bearing assembly engages an outer surface of the rack at two points circumferentially spanning a large angle to provide improved support. The roller bearing is preferably a plurality of ball bearings engaging an outer race. A deformable member may be utilized that is positioned between the outer race and the rack housing. The deformable member may comprise a series of O-rings which providing a force biasing the outer race towards the pinion.

22 Claims, 6 Drawing Sheets

YOKE BEARING PROVIDING IMPROVED SUPPORT

FIELD OF THE INVENTION

The present invention relates generally to steering gear assemblies having a rack and pinion, and more particularly relates to yoke bearings supporting engagement of the rack and pinion.

BACKGROUND OF THE INVENTION

A steering gear assembly typically comprises a rack and pinion gear system that translates the rotational movement of the pinion into linear movement of the rack. Many modern vehicles include electric power assisted steering, and these gear assemblies utilize dual pinions. One pinion is responsive to steering wheel input, while the other pinion is powered by an electric motor to provide steering assistance or other controlled steering operations.

When the pinions are subject to high torques or quick changes in torque direction, separation forces are generated between the rack and pinion gears. Accordingly, a yoke assembly is typically provided to keep the rack and pinion in engagement. The yoke assembly typically includes a slide bearing that is biased by a spring to press the rack into engagement with the pinion. Unfortunately, as higher and higher pinion torque is generated, which is especially the case with pinions driven by an electric motor, large separation forces are generated. Thus, large spring forces are required to press the yoke and yoke bearing against the rack. However, higher spring forces result in increased friction between the rack and the yoke bearing.

To overcome these deficiencies, roller bearings have been proposed for use as the yoke bearing. While roller bearings allow higher spring forces with lower coefficients of friction between the rack and bearing, these designs are not without their drawbacks. For example, it has been found that the supporting force provided by current yoke roller bearings on the rack are not as robust as the support obtained by slide bearings. Accordingly, there exists a need to provide a steering gear assembly having a yoke bearing which provides robust support to the rack to provide improved engagement of the rack and pinion gears, while maintaining a low coefficient of friction between the rack and yoke bearing.

BRIEF SUMMARY OF THE INVENTION

The present invention provides a steering gear assembly including a pinion defining a pinion axis and a rack defining a rack axis. The rack operatively engages the pinion for translation along the rack axis. A bearing assembly includes a roller bearing biased against the rack to generate a normal force pressing the rack into engagement with the pinion. The bearing assembly engages an outer surface of the rack at two points circumferentially spanning greater than 140 degrees. Preferably, the the bearing assembly engages the outer surface of the rack at two points circumferentially spanning 175 to 185 degrees.

According to more detailed aspects, the bearing assembly includes an outer race and the roller bearing is slidably disposed between the race and the outer surface of the rack. The race is biased towards the rack, and the roller bearing slides along the race parallel to the rack axis. Preferably, the roller bearing comprises a plurality of ball bearings. The plurality of ball bearings are arranged in rows that are circumferentially spaced about the outer surface of the rack, the rows extending along the rack axis. The rows are preferably axially spaced and circumferentially overlap. The rows extend axially a distance greater than the diameter of the pinion. The roller bearing slides relative to the outer race and within a range of motion defined by a pin attachment to the inner race, the pin moving within a slot formed in the outer race.

Another embodiment of the invention provides a yoke bearing assembly for a steering gear assembly having a pinion defining a pinion axis and a rack defining a rack axis orthogonal to the pinion axis. The yoke bearing assembly includes an outer race and an inner race positioned inside the outer race. A plurality of ball bearings are positioned within a plurality of apertures formed in the inner race, each ball bearing disposed between the outer race and an outer surface of the rack. The plurality of ball bearings and the inner race translate along the outer race as the rack translates axially along the rack axis. A deformable member is positioned between the outer race and the rack housing, the deformable member providing a force biasing the outer race towards the pinion. Each ball bearing transmits the force to the rack for keeping the rack and pinion in engagement, the deformable member responsive to loads transmitted from the rack to the outer race.

According to more detailed aspects, the deformable member is preferably an elastomeric ring, and most preferably a series of axially spaced elastomeric rings. Alternatively, the deformable member may comprise a sheet of elastomeric material. The inner race has a semi-circular cross-sectional shape, and the plurality of ball bearings are spaced circumferentially about the outer surface of the rack an angle greater than 140 degrees.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
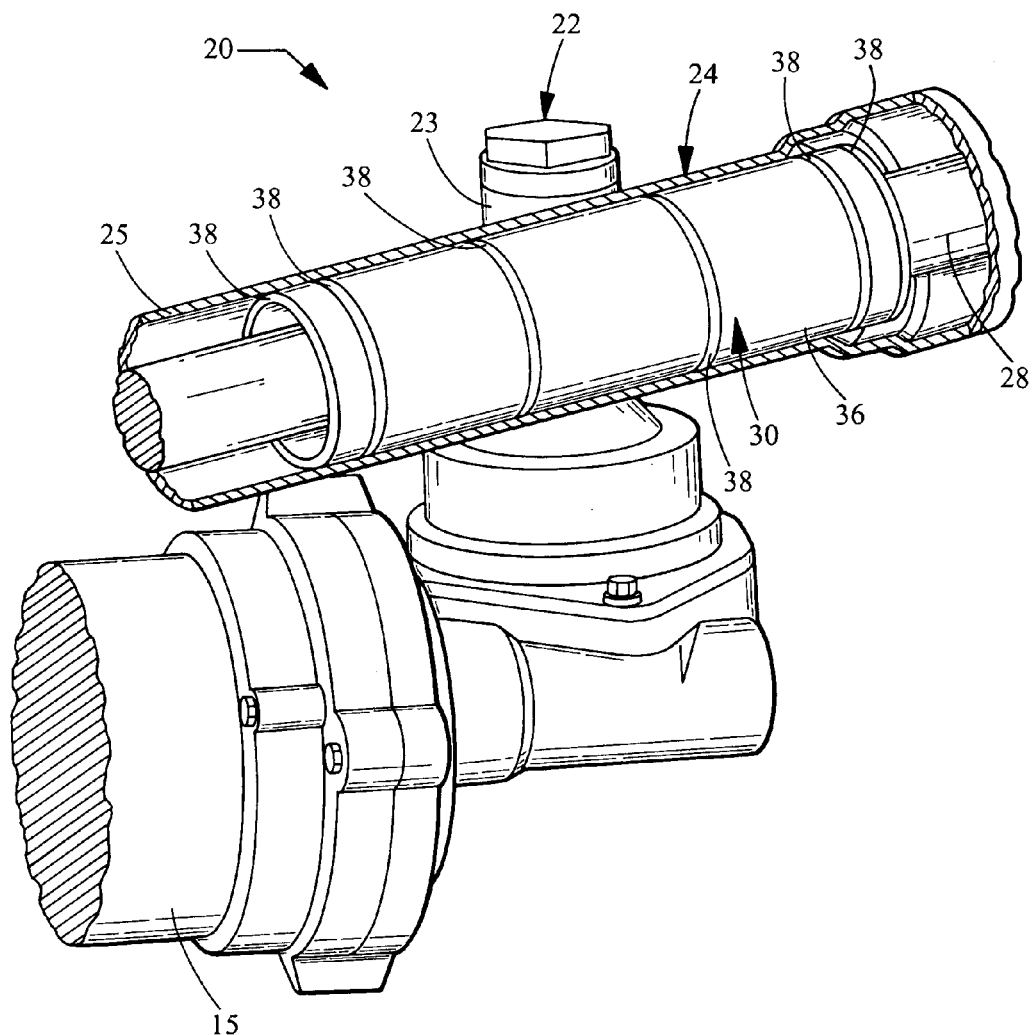
FIG. 1 is a perspective view of a steering gear assembly constructed in accordance with the teachings of the present invention.
Figure 2:
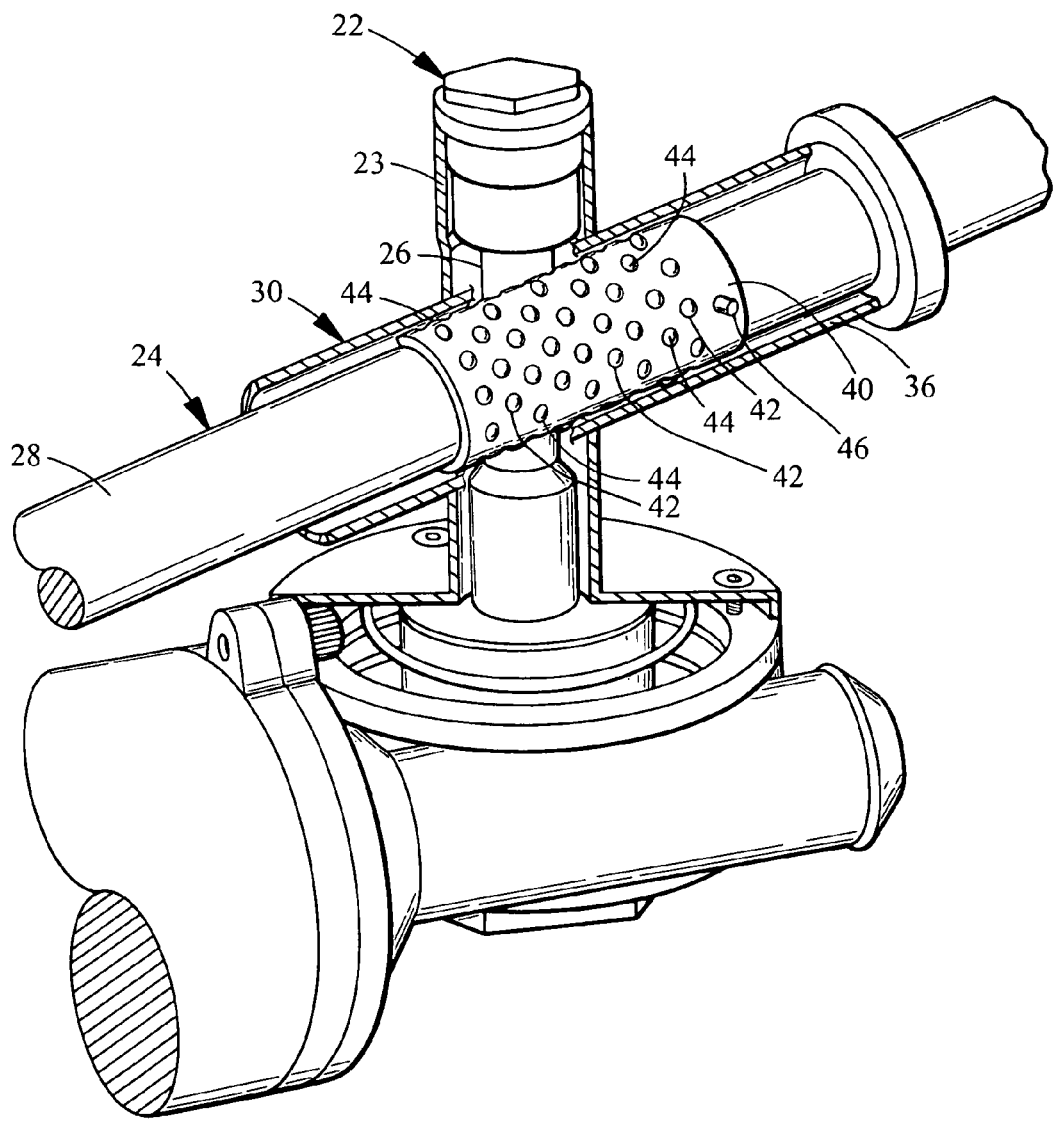
FIG. 2 is a perspective view similar to FIG. 1, having the rack housing removed.
Figure 2A:
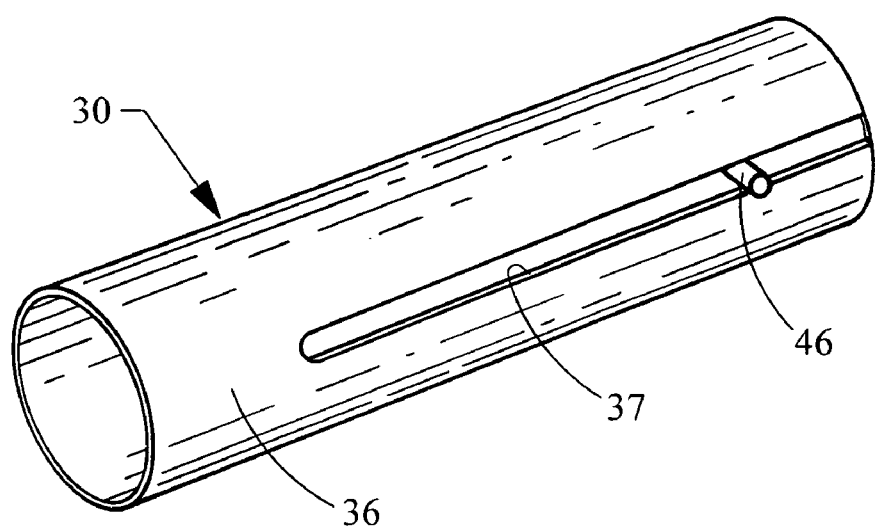
Figure 3:
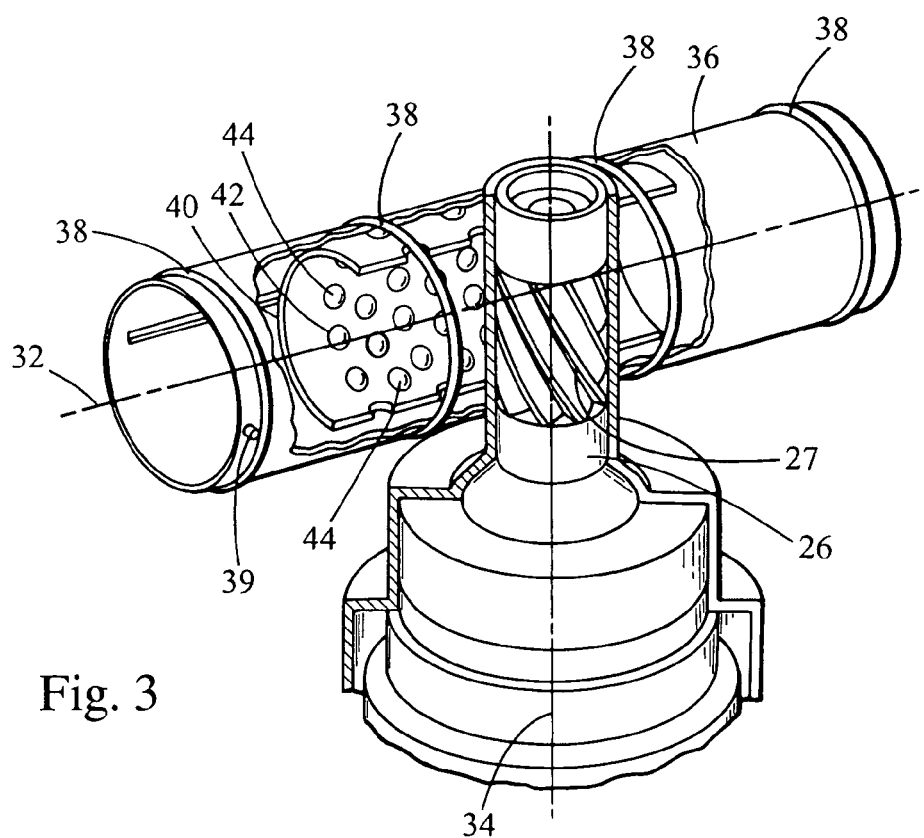
FIG. 3 is a perspective view similar to FIG. 2, but taken from the rear.

Turning now to the figures, FIG. 1 is a perspective view of a steering gear assembly 20 constructed in accordance with the teachings of the present invention. The steering gear assembly 20 generally includes a pinion 22 operatively connected to a rack 24. The pinion 22 generally includes a pinion housing 23 substantially enclosing a pinion gear 26 (FIGS. 2 and 3). The pinion gear 26 includes teeth 27 (FIG. 3) which is driving engagement with the rack 24. The rack 24 generally includes a housing 25 which substantially encloses a rack gear 28. The rack gear 28 is linearly translated by virtue of its engagement with the pinion gear 26, as is well understood in the art. A bearing assembly 30 engages the rack 24 and biases the same into the pinion 22 to provide reliable engagement of the rack 24 and pinion 22.

Uniquely, the bearing assembly 30 of the present invention provides improved support to the rack 24. Not only does the bearing assembly 30 provide increased support along the rack axis 32 (FIG. 3), but also provides increased support relative to the pinion axis 34 (FIG. 3). In addition to typical separation forces between the pinion 22 and rack 24, it has also been found that various forces are transmitted through the rack gear 28 itself, a portion of which can be directed along the pinion axis 34. That is, the rack gear 28 may be subject to loads which force it to slide along the pinion axis 34, vertically in FIGS. 1–3.

Accordingly, the present invention provides additional support to the rack 24 in the direction parallel to the pinion axis 34. As best seer in FIGS. 2 and 3. the bearing assembly 30 includes a cage or inner race 40 ) positioned within an outer race 36. The inner race 40 includes a plurality of apertures 42 sized to receive a plurality of ball bearings 44. Notably, the inner race 40 has a C-shaped cross-section. Stated another way, the inner race 40 has a semi-circular cross-section. Preferably, the inner race 40 extends circL inferentially around the rack gear 28 at least 140 degrees, and preferably 170 to 190 degrees, and most preferably about 180 degrees. By virtue of this structure, the bearing assembly 30 provides support to the rack gear 28 in a direction both perpendicular to the pinion axis 34, as well as parallel to the pinion ax s 34.

The ball bearings 44 have a diameter greater than the thickness of the inner race 40. Accordingly, the ball bearings 44 engage an outer surface of the rack gear 28. Similarly, the ball bearings 44 also engage an inner surface of the outer race 36. Thus, as the pinion gear 26 translates the rack gear 28 linearly along the rack axis 32, the inner race 40 and the ball bearings 44 slide along both the outer surface of the rack gear 28 as well as the inner surface of the outer race 36. In short, the inner race 40 and the ball bearings 44 roll axially along the rack axis 32 as the rack gear 28 moves linearly along the same axis.

The axial movement of the inner race 40 and the ball bearings 44 are constrained by way of a pin 46 formed on the inner race 40. The outer race 36 includes a slot 37 which extends parallel to the rack axis 32. The slot 37 is sized to receive the pin 46, and the ends of the slot 37 define the range of movement allowed to the pin 46, and hence the inner race 40. Furthermore, the pin 46, by extending through slot 37, prevents the rotation of the inner race 40 about the rack gear 28 and the rack axis 32. It is important to keep the inner race 40 in the position shown in the figures in order to ensure proper support to the rack gear 28 and engagement with the pinion gear 26.

As just discussed, the inner race 40 is positioned between the rack gear 28 and the outer race 36. The plurality of ball bearings 44 engage both the outer surface of the rack gear 28 and the inner surface of the outer race 36. To ensure reliable engagement of the rack and pinion gears 28, 26, the outer race 36 is biased toward the pinion 22. Uniquely, the present invention accomplishes this objective by utilizing a plurality of O-rings 38 attached to the outer periphery of the outer race 36. The O-rings 38 also engage the rack housing 25 and are compressed between the housing 25 and the outer race 36. Since the O-rings 38 are constructed of an elastomeric material, the O-rings 38 can be deformed to provide a force against the outer race 36. Preferably, this force is primarily directed toward the pinion 22, and is normal to the pinion axis 34. However, it will be recognized that other radial components of this force are also present, including forces along the pinion axis 34.

This engagement force against the outer race 36 is transmitted through the ball bearings 44 to the rack gear 28, pressing it into engagement with the pinion gear 26. Due to vibrations or other manufacturing tolerances, the rack gear 28 is allowed some movement away from the pinion 22 which will result in a compression of the O-rings 38. However, due to the deformable and elastomeric nature of the O-rings 38, the rack gear 28 will continue to be pressed into engagement with the pinion gear 26.

Figure 3A:
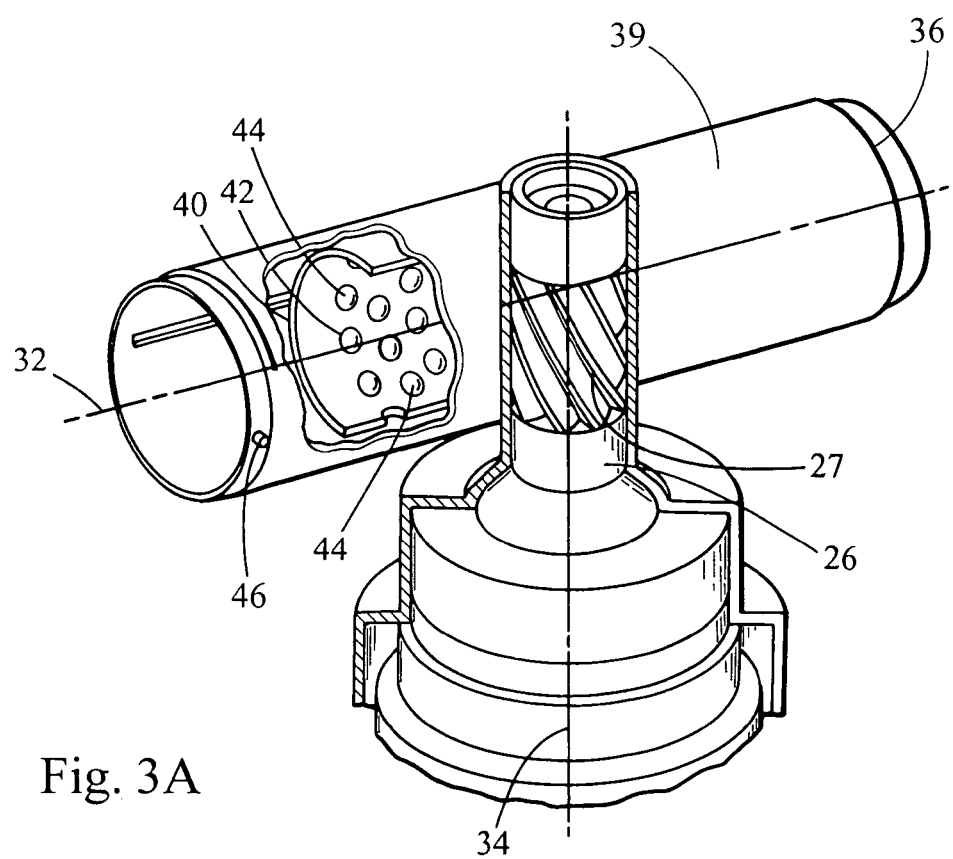

It will be recognized that other biasing means can be provided In place of or in addition to the O-rings 38. For example, a large elastomeric sheet 39 can be provided between the outer race 36 and the rack housing 25 as shown in FIG. 3a. Likewise, other deformable members, such as a plurality of springs could also be employed. One such alternate embodiment has been depicted in FIGS. 4 and 5.

In this embodiment, like parts have been given like reference numerals. As in the prior embodiment, a pinion 22 and rack 24 are operatively engaged such that rotation of a pinion gear 26 drives the rack gear 28 linearly along the rack axis 32. An inner race 40 houses a plurality of ball bearings 44. The ball bearings 44 engage an inner surface of the outer race 36 as well as the outer surface of the rack gear 28. Here, however, the O-rings 38 have been replaced with a traditional biasing assembly, namely a plug 50 engaging the rack housing 25 to position a spring 52 for biasing a yoke 54 into engagement with the outer race 36. In turn, the outer race 36 presses the ball bearings 44 into the rack gear 28, and hence into engagement with the pinion gear 26.

Figure 4:
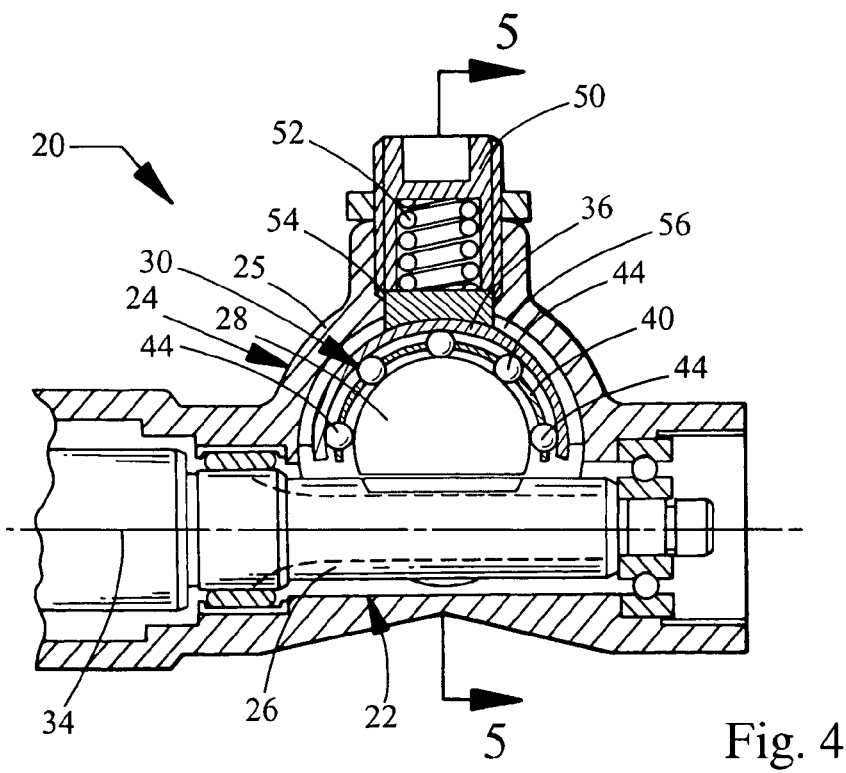
FIG. 4 is a cross-sectional view of an alternate embodiment of the steering gear assembly constructed in accordance with the teachings of the present invention.

It can be seen clearly in FIG. 4 that the inner race 40 and ball bearings 44 provide support to the rack gear 28, not only in a direction orthogonal or normal to the pinion axis 34, but also provides support in a direction generally parallel to and along the pinion axis 34. That is, the inner race 40 and ball bearings 44 extend circumferentially around the outer surface of the rack gear 28a large angle, preferably about 180°. In this way, the present invention prevents the rack gear 28 from being jostled axially along the pinion axis 34 by forces such as those induced by tie-rod loads.

Figure 5:
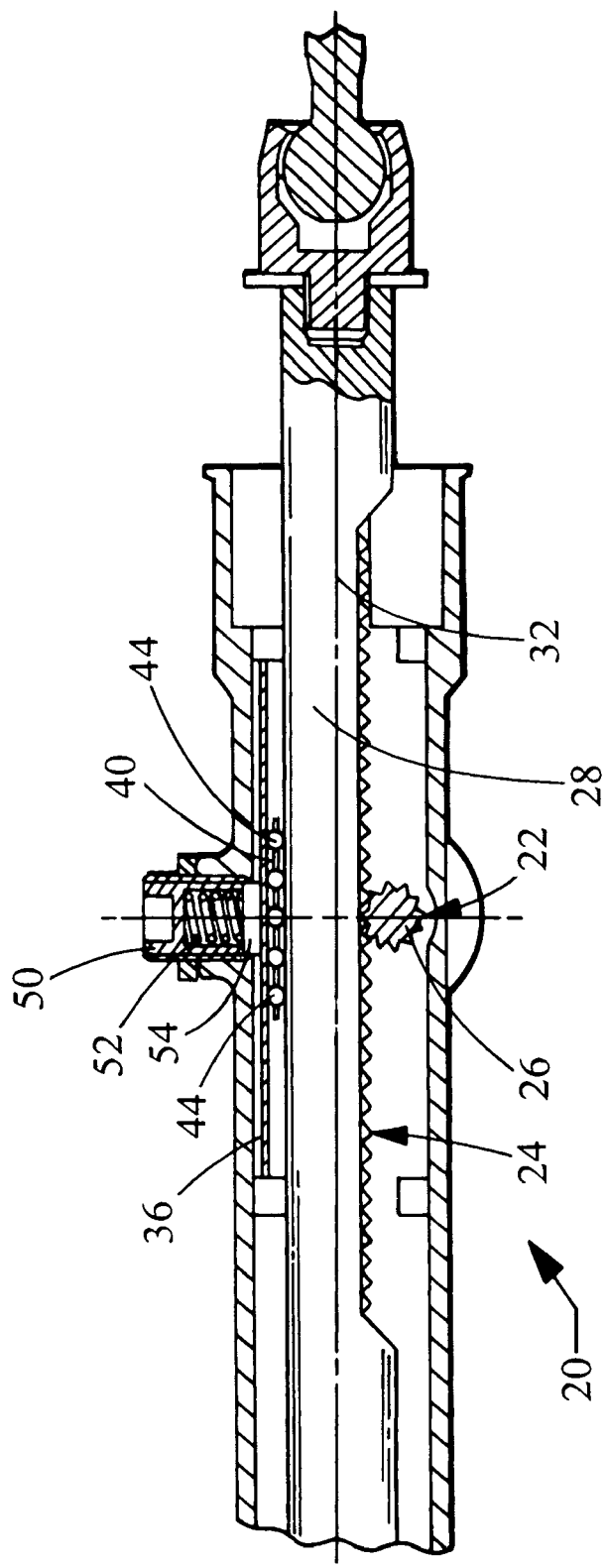
FIG. 5 is a cross-sectional view taken above the 5–5 in FIG. 4.

Turning to the cross-sectional view of FIG. 5, it can be seen that the inner race 40 and the ball bearings 44, through which the normal biasing force of the spring 52 is transmitted to the rack gear 28, spans a significant distance along the rack axis 32. In this way, the bearing assembly 30 also provides robust support along a significant portion of the rack 24. Preferably, the inner race 40 and ball bearings 44 extend a distance along the rack axis 32 that is greater than a diameter of the pinion gear 26. Most preferably, the inner race 40 and ball bearings 44 extend an axial distance that is greater than one-third the range of motion provided to the inner race 40. In this way, at least some portion of the inner race 40 and ball bearings 44 are positioned below the yoke spring 52 and orthogonal to both the rack and pinion axes 32, 34. Stated another way, the bearing assembly 30 is structured that at least a portion of the inner race 40 and ball bearings 44 are always located between the pinion gear 26 and the rack gear 28.

Preferably, the plurality of ball bearings 44 are arranged in rows that are circumferentially space about the outer surface of the rack gear 28. The rows of ball bearings 44 extend along the rack axis 32. As best seen in FIGS. 2 and 3, the rows of ball bearings 44 are axially spaced and circumferentially overlap to provide a compact force transmitting area. Stated another way, each row of ball bearings 44 zigzags circumferentially as the row extends along the rack axis 32.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A steering gear assembly comprising:
a pinion defining a pinion axis;
a rack defining a rack axis orthogonal to the pinion axis, the rack operatively engaging the pinion for translation along the rack axis;
a bearing assembly having a rolling bearing biased against the rack to generate a normal force pressing the rack into engagement with the pinion; and
the bearing assembly engaging an outer surface of the rack at two points circumferentially spanning 175 to 185 degrees.

2. The assembly of claim 1, further comprising a yoke engaging the bearing assembly, the yoke biased by a spring against the bearing assembly to generate the normal force.

3. The assembly of claim 1, further comprising at least one compressible member positioned between a housing for the rack and the bearing assembly.

4. The assembly of claim 3, wherein the compressible member spans circumferentially a degree greater than or equal to the degree the bearing assembly engages the outer surface or the rack.

5. The assembly of claim 1, wherein the bearing assembly includes an outer race and the rolling bearing is slidably disposed between the outer race and the outer surface of the rack.

6. The assembly of claim 5, wherein the outer race is biased towards the rack, and wherein the rolling bearing translates along the outer race parallel to the rack axis.

7. The assembly of claim 6, wherein the rolling bearing is contained within a wherein the roller bearing slides relative to the outer race and within a range of motion defined by a pin attached to the cage, the pin moving within a slot formed in the outer race.

8. The assembly of claim 5, wherein the rolling bearing comprises a plurality of ball bearings.

9. The assembly of claim 8, wherein the plurality of ball bearings are arranged in rows that are circumferentially spaced about the outer surface of the rack, the rows extending along the rack axis.

10. The assembly of claim 9, wherein the rows are axially spaced and circumferentially overlap.

11. The assembly of claim 10, wherein the rows extend a distance greater than the diameter of the pinion.

12. The assembly of claim 9, wherein each row zigzags circumferentially as the row extends along the rack axis.

13. The assembly of claim 7, wherein the bearing assembly extends along the rack axis a distance greater than one-third the range of motion.

14. A yoke bearing assembly for a steering gear assembly having a pinion defining a pinion axis and a rack defining s rack axis orthogonal to the pinion axis, the pinion drivingly engaging the rack for translation within a rack housing along the rack axis, the yoke bearing assembly comprising:
an outer race;
a cage positioned inside the outer race;
a plurality of ball bearings positioned within a plurality of apertures formed in the cage, each ball bearing disposed between the outer race and an outer surface of the rack, the plurality of ball bearings and the cage translating along the outer race as the rack translates axially along the rack axis the plurality of ball bearings engaging the rack over a circumferential bearing range; and
a deformable member positioned between the outer race and the rack housing, the deformable member extending circumferentially over a deformable member range greater than or equal to the bearing range the deformable member providing a force biasing the outer race towards the pinion, each ball bearing transmitting the force to the rack for keeping the rack and pinion in engagement, the deformable member responsive to loads transmitted from the rack to the outer race.

15. The yoke bearing assembly of claim 14, wherein the deformable member is axially spaced away from the pinion along the rack axis.

16. The yoke bearing assembly of claim 14, wherein the deformable member is a series of axially spaced elastomeric rings spaced along the rack axis.

17. The yoke bearing assembly of claim 14, wherein the deformable member follows a curved path centered on the rack axis.

18. The yoke bearing assembly of claim 14, wherein the inner race has a semi-circular cross-sectional shape.

19. The yoke bearing assembly of claim 14, wherein the outer race includes a slot extending along the rack axis, and wherein a cage includes a pin extending into the slot, the slot defining a range of motion for the cage and ball bearings.

20. The yoke bearing assembly of claim 19, wherein the cage extends a distance greater than one third the range of motion.

21. The yoke bearing assembly of claim 14, wherein the deformable member circumscribes the outer race.

22. A yoke bearing assembly for a steering gear assembly having a pinion defining a pinion axis and a rack defining a rack axis orthogonal to the pinion axis, the pinion drivingly engaging the rack for translation within a rack housing along the rack axis, the yoke bearing assembly comprising:
an outer race;
a cage positioned inside the outer race;
a plurality of ball bearings positioned within a plurality of apertures formed in the cage, each ball bearing disposed between the outer race and an outer surface of the rack, the plurality of ball bearings and the cage translating along the outer race as the rack translates axially along the rack axis the plurality of ball bearings engaging the rack over a circumferential bearing range; and
a deformable member positioned between the outer race and the rack housing, the deformable member extending circumferentially over a deformable member range greater than or equal to the bearing range the deformable member.

* * * * *

UNITED STATES PATENT AND TRADEMARK OFFICE
CERTIFICATE OF CORRECTION

| | | |
|---|---|---|
| PATENT NO. | : 7,032,470 B2 | Page 1 of 1 |
| APPLICATION NO. | : 10/459170 | |
| DATED | : April 25, 2006 | |
| INVENTOR(S) | : James Robertson et al. | |

It is certified that error appears in the above-identified patent and that said Letters Patent is hereby corrected as shown below:

In the Claims

Column 6, in claim 14, line 2, after "rack defining" delete "s" and substitute --a-- in its place.

Column 6, in claim 22, lines 18-19, after "equal to the bearing" delete "range the deformable member." and substitute --range.-- in its place.

Signed and Sealed this

Third Day of October, 2006

JON W. DUDAS
*Director of the United States Patent and Trademark Office*